United States Patent [19]

Oka et al.

[11] Patent Number: 5,168,483

[45] Date of Patent: Dec. 1, 1992

[54] MAGNETIC HEAD POSITION CONTROL APPARATUS INCLUDING DRIVE MEANS RESPONSIVE TO A SUMMED SIGNAL FROM A CAPACITANCE DETECTION ELECTRODE AND A DISK SIZE DETECTOR MEANS

[75] Inventors: Nobuyuki Oka, Kanagawa; Hiroshi Eto, Tokyo; Nobuyuki Yasuda; Tetpei Yokota, both of Chiba, all of Japan

[73] Assignee: Sony Corporation, Tokyo, Japan

[21] Appl. No.: 772,348

[22] Filed: Oct. 7, 1991

Related U.S. Application Data

[62] Division of Ser. No. 570,551, Aug. 21, 1990, Pat. No. 5,095,470.

[30] Foreign Application Priority Data

Aug. 22, 1989 [JP] Japan .................................. 1-214138
Nov. 15, 1989 [JP] Japan .................................. 1-132045

[51] Int. Cl.⁵ ...................... G11B 13/04; G11B 11/10; G11B 11/12; G11B 5/58
[52] U.S. Cl. ........................................ 369/13; 360/59; 360/114; 360/66
[58] Field of Search ................ 369/13, 126; 360/59, 360/114, 103, 66

[56] References Cited

U.S. PATENT DOCUMENTS

| 2,982,822 | 5/1961 | Bacon . | |
|---|---|---|---|
| 4,706,232 | 11/1987 | Funada et al. | 369/13 |
| 4,931,887 | 6/1990 | Hegde et al. | 360/103 |
| 4,937,801 | 6/1990 | Miura et al. | 369/13 |
| 4,998,231 | 3/1991 | Watanabe et al. | 369/13 |

FOREIGN PATENT DOCUMENTS

| 0342624 | 11/1989 | European Pat. Off. | 369/13 |
|---|---|---|---|
| 57-133503 | 8/1982 | Japan | 369/13 |
| 62-185269 | 8/1987 | Japan . | |
| 1-260607 | 10/1989 | Japan . | |

*Primary Examiner*—Hoa Nguyen
*Attorney, Agent, or Firm*—Lewis H. Eslinger; Jay H. Maioli

[57] ABSTRACT

A magnetic head position control apparatus for driving the magnetic head of a disc recording apparatus toward or away from the recording surface of a magneto-optical disc to effect position control of the magnetic head detects changes in the distance between the magnetic head and the magneto-optical disc by detecting changes in the capacitance between a capacitance detection electrode mounted on the magnetic head and a surface of the magnetic disc and generates a voltage to control the position of the magnetic head for maintaining it at a constant predetermined distance from the magneto-optical disc. Stray capacitance between the disc and the disc recording apparatus is based on the size of the disc, which is either detected directly or obtained from pre-recorded data on the disc, and is compensated by adding a bias voltage to the voltage generated using the capacitance detection electrode to provide further control of the position of the magnetic head.

5 Claims, 4 Drawing Sheets

MAGNETIC HEAD POSITION CONTROL APPARATUS INCLUDING DRIVE MEANS RESPONSIVE TO A SUMMED SIGNAL FROM A CAPACITANCE DETECTION ELECTRODE AND A DISK SIZE DETECTOR MEANS

This is a division of application Ser. No. 07/570,551, filed Aug. 21, 1990, now U.S. Pat. No. 5,095,470.

BACKGROUND OF THE INVENTION

1. Field of the Invention

This invention relates generally to a magnetic head position control system and, more particularly to a system in which the magnetic head employed in recording a magneto-optical disk is driven to maintain a constant distance between the recording surface of the disk and the magnetic head.

2. Description of the Background

In a recording apparatus for a magneto-optical disk in general, an optical head and a magnetic head are disposed in a contact-free fashion on opposing sides of the disk. The recording apparatus operates in accordance with a magnetic field modulation system, whereby a magnetic field corresponding to the recording signal is generated by the magnetic head and applied to the magneto-optical disk, and the area of the disk that is subjected to the magnetic field is heated by a laser beam from the optical head, thereby effecting signal recording.

Because of the information density requirements and the dimensions involved, the laser beam emitted from the optical head must be properly focused onto the disk. The optical head generally controls the focus by collecting focusing data produced by the laser light irradiated onto and reflected from the recording area of the disk, thereby producing a predetermined spot on the recording surface of the disk for recording. By this means, it is possible for the above-described optical head to remain at a constant distance from the magneto-optical disk even when the relative position between the magneto-optical disk and the optical head is changed due to fluctuations in the thickness of the magneto-optical disk, the rotating disk deviates from its in-plane position, or the disk table adapted for rotating the disk is tilted. In the absence of some means for detecting the relative distance between the magnetic head and the magneto-optical disk, the magnetic head must be mounted at a position sufficiently spaced apart from the magneto-optical disk so that the magnetic head will not contact the magneto-optical disk, even when the position of the magneto-optical disk fluctuates in one or more of the above-described fashions.

When the magnetic head is too far away from the magneto-optical disk, the power consumption is disadvantageously increased because the magnetic head must generate a stronger magnetic field for supplying the predetermined recording magnetic field to the recording surface of the magneto-optical disk. In other words, when the separation between the magnetic head and the magneto-optical disk is excessive, an insufficient magnetic field will be applied to the recording surface of the magneto-optical disk, thereby increasing the error rate or lowering the S/N ratio. In the worst of cases, recording may be unfeasible.

For obviating the above inconvenience, an electrode may be mounted on the magnetic head in opposition to the magneto-optical disk for detecting changes in the relative distance between the magnetic head and the disk based on changes in capacitance between the disk and the electrode. The position of the magnetic head may be controlled by the detection output of the electrode for maintaining a constant relative distance between the magnetic head and the disk and to enable the magnetic head to be positioned in the vicinity of the magneto-optical disk. Japanese patent application no. 01-214138 proposes a floating control of a perpendicular magnetic recording system including a disk medium and a stylus, which corresponds to a magnetic head.

However, when the changes in the relative distance between the magnetic head and the disk are measured by the changes in capacitance between the magneto-optical disk and the capacitance detection electrode mounted on the magnetic head, the accuracy of the control of the magnetic head position by the detection output is affected by the linearity of temperature characteristics of the control circuit, so that a predetermined relative distance between the magnetic head and the disk cannot be maintained with accuracy.

OBJECTS AND SUMMARY OF THE INVENTION

Accordingly, it is an object of the present invention to provide a magnetic head position control apparatus for use with a magneto-optical disk that can eliminate the above-noted defects inherent in previously proposed systems.

It is another object of the present invention to provide a magnetic head position control apparatus in which changes in the relative distance between the magnetic head and the magneto-optical disk are detected from changes in capacitance between a capacitance detection electrode mounted on the magnetic head and the magneto-optical disk.

It is a further object of the present invention to provide a position control system in which the magnetic head is accurately maintained at a predetermined distance from the magneto-optical disk, without being influenced by temperature characteristics or nonlinearities of the control circuit.

According to an aspect of the present invention a magnetic head position control apparatus includes a magnetic head in opposition to the magneto-optical disk, an oscillator circuit having an oscillation frequency that is variable as a function of changes in capacitance between the capacitance detection electrode and the magneto-optical disk, a phase locked loop type phase detection circuit for detecting a phase difference between the output of the oscillator circuit and the output of a voltage controlled oscillator having oscillation characteristics close to those of the oscillator circuit, whereby the oscillation output of the oscillator circuit performs feedback control of the phase of the voltage controlled oscillator based on the output of the phase detection circuit to form an ultimate detection output based thereon, and a head driver, operating in response to the ultimate detection output of the phase locked loop type phase detection circuit to drive the magnetic head, as well as the capacitance detection electrode, towards or away from the recording surface of the magneto-optical disk.

In accordance with the above described magnetic head position control apparatus, changes in the relative distance between the magnetic head and the magneto-optical disk are detected in the form of changes in capacitance between the capacitance detection electrode attached to the magnetic head and the magneto-optical disk. The oscillation frequency of the oscillator circuit changes with changes in the capacitance. The phase locked loop type phase detection circuit detects the phase difference between the oscillation output of the voltage controlled oscillator forming a portion of the phase locked loop type phase detection circuit and the oscillation output of the oscillator circuit. It is by this oscillation output that the oscillation output of the voltage controlled oscillator is controlled in a feedback control fashion. The voltage controlled oscillator has oscillation characteristics similar to those of the oscillator circuit so that errors ascribable to differences in temperature characteristics and nonlinearities of the oscillator circuit and the voltage controlled oscillator will not exist. The phase locked loop type phase detection circuit produces a detection output corresponding to changes in the relative distance between the magnetic head and the magneto-optical disk, which is sent to the head driver as control signals. The head driver, in turn, drives the magnetic head in accordance with the control signals to maintain the relative distance at a constant value.

The manner in which the above and other objects, features, and advantages are achieved by the present invention will become apparent from the following description thereof, to be read in conjunction with the accompanying drawings in which like reference numerals represent the same or similar elements.

DETAILED DESCRIPTION OF PREFERRED EMBODIMENTS

Figure 1:
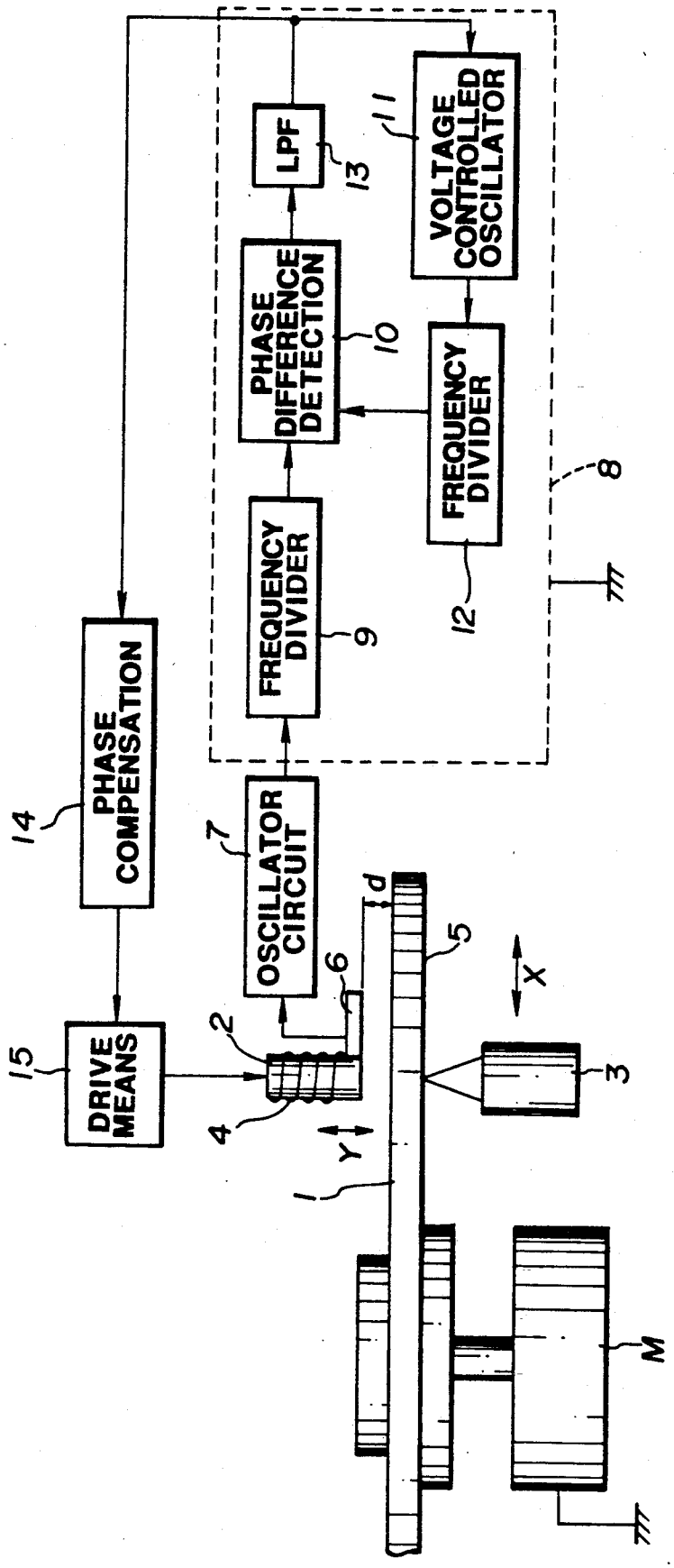
FIG. 1 is a block diagram showing the construction of a magnetic head position control apparatus according to an embodiment of the present invention.

Referring to FIG. 1, the recording apparatus for a magneto-optical disk includes a magnetic head 2 and an optical head 3 arranged in a contact-free manner on opposing sides of a magneto-optical disk 1 rotationally driven by a spindle motor M. The magnetic head 2 applies a recording magnetic field to a recording surface 5 of the magneto-optical disk 1, which magnetic field corresponds to a current that runs through a recording coil 4 from a recording signal processing circuit (not shown). The optical head 3 irradiates onto the recording surface 5 of the magneto-optical disk 1 a laser beam that is generated from a laser diode (not shown) enclosed in the optical head 3. The information to be stored on the disk is recorded on the recording surface 5 by the recording magnetic field and the laser beam. The magnetic head 2 and the optical head 3 are attached to a slider, not shown, so as to be simultaneously driven radially across the disk 1 as indicated by an arrow X. The magnetic head 2 and the optical head 3 may also be moved in a direction towards or away from the recording surface 5 of the disk 1 as indicated by an arrow Y. The optical head 3 may be controlled by a focusing servo in the direction shown by the arrow Y.

The magnetic head position control apparatus of the present invention regulates the position of the magnetic head 2 by moving the magnetic head in a direction towards or away from the recording surface 5 of the disk 1 as indicated by the arrow Y. This magnetic head position control apparatus is hereinafter explained.

A capacitance detection electrode 6 is attached to the magnetic head 2 facing the magneto-optical disk 1. This detection electrode 6 is movable in the direction of the arrow Y along with the magnetic head 2. A capacitance is generated between the detection electrode 6 and the magneto-optical disk 1 as a function of the relative distance between the electrode 6 and the disk 1. Thus the changes in the relative distance between the disk 1 and the head 2 may be detected by measuring the change in the capacitance.

Figure 2:
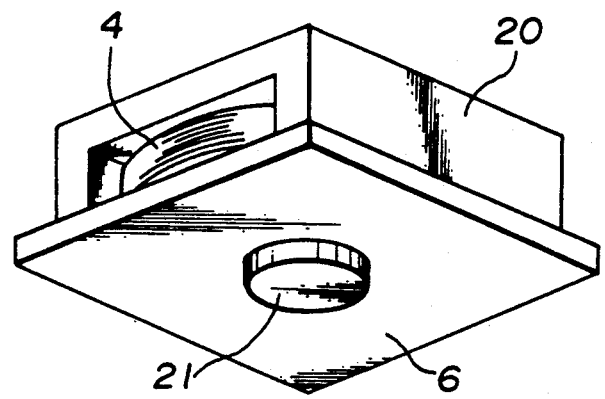
FIG. 2 is a perspective view of a capacitance detection electrode mounted on a magnetic head as employed in the magnetic head position control apparatus of FIG. 1.
Figure 3:
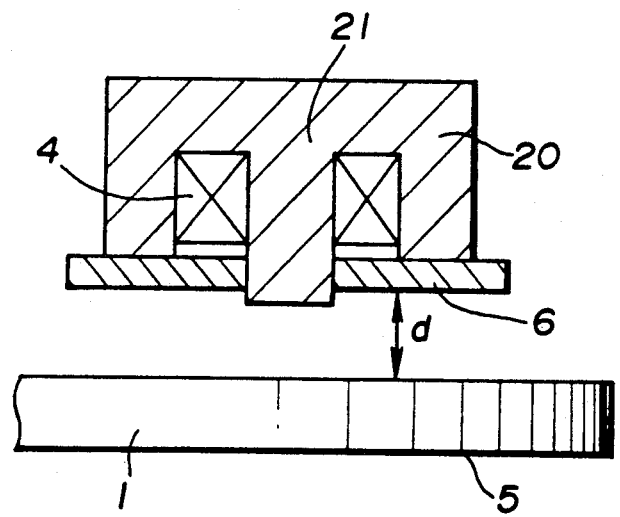
FIG. 3 is a cross-sectional view of the magnetic head shown in FIG. 2.

FIGS. 2 and 3 illustrate a concrete example of the construction of the magnetic head 2 fitted with the capacitance detection electrode 6. As shown therein, the magnetic head 2 is formed by a core 20 having a U-shaped cross-section. A magnetic yoke 21 in the form of a column is projected from the center of an inner wall of the web of the U-shaped core 20. A recording coil 4 is wound about the peripheral wall of the magnetic yoke 21. The capacitance detection electrode 6 is formed of a square-shaped metallic plate having a central through-hole for receiving the magnetic yoke 21. The capacitance detection electrode 6 is secured to the ends of both arms of the U-shaped core 20 with the foremost part of the magnetic yoke 21 passing through the through-hole. When in use, the magnetic head 2 is mounted with the end of the magnetic yoke 21 and the capacitance detection electrode 6 facing the magneto-optical disk 1.

Figure 4:
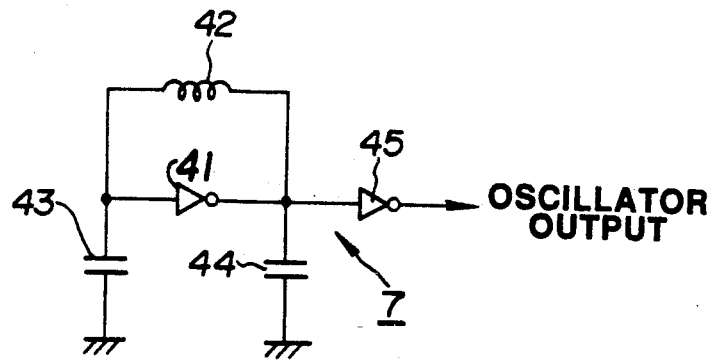
FIG. 4 is a schematic diagram of an oscillator circuit employed in the magnetic head position control apparatus of FIG. 1.

The capacitance detection electrode 6 is connected to an oscillator circuit 7 in the manner shown in FIG. 1. The oscillation frequency of the oscillator circuit 7 is variable as a function of the capacitance changes detected by the capacitance detection electrode 6 and is constructed as shown for example in FIG. 4. Thus, the oscillator circuit 7 shown in FIG. 4 is an LC oscillator circuit comprised of an amplifier 41, a coil 42 connected across the input and output terminals of the amplifier 41 and a pair of capacitors 43, 44 connected respectively between the input and output terminals of the amplifier 41 and ground. The capacitance of the capacitor 43 corresponds to the capacitance between the electrode 6 and the disk 1. Thus, the oscillation frequency of the circuit 7 changes as a function of the capacitance change in the capacitor 43, that is, the capacitance change between the electrode 6 and the disk 1. The oscillation output of the oscillator circuit 7 is output from the amplifier 41 by means of a buffer amplifier 45.

This oscillator circuit 7 is provided in proximity to the capacitance detection electrode 6. By providing the circuit 7 in proximity to the capacitance detection electrode 6, the effect of any stray capacitance may be reduced. Also, by setting the Q of the oscillator circuit 7 at a higher value, the circuit 7 is less susceptible to disturbances from the electro-magnetic field created by the magnetic head 3 so that the circuit 7 may perform a more stable control operation.

The oscillation output from the oscillator circuit 7 is supplied to a phase locked loop (PLL) type phase detection circuit 8 which is comprised of a phase difference detection circuit 10, a voltage controlled oscillator 11, and a low-pass filter LPF 13 or the like. The oscillation output from the oscillator circuit 7 is supplied to the phase difference detection circuit 10 by means of a frequency divider 9, the oscillation output of the voltage controlled oscillator is supplied to the phase difference detection circuit 10 by means of a frequency divider 12, and the detection output of the phase difference detection circuit 10 is fed back to the voltage controlled oscillator 11 by means of the LPF 13.

Figure 5:
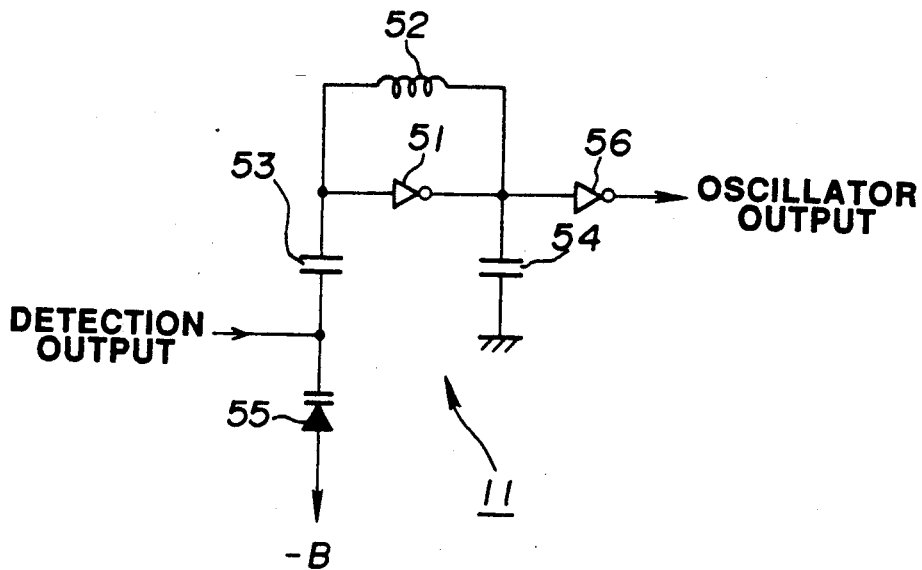
FIG. 5 is a schematic diagram of a voltage controlled oscillator employed in the magnetic head control apparatus of FIG. 1.

The voltage controlled oscillator 11 has oscillation characteristics similar to those of the oscillator circuit 7, and may be constructed, for example, as shown in FIG. 5. Thus, similar to the oscillator circuit 7 shown in FIG. 4, the voltage controlled oscillator 11 shown in FIG. 5 is comprised of an amplifier 51, a coil 52 connected across the input and output terminals of the amplifier 51, a capacitor 54 connected between the output terminal of the amplifier 51 and ground, and a capacitor 53 connected between the input terminal of the amplifier 51 and a negative power source $-B$ by means of a variable capacitance diode 55. The detection output of the phase difference detection circuit 10 is supplied via LPF 13 to the junction between the capacitor 53 and the variable capacitance diode 55, whereby the capacitance of the diode 55 is variable as a function of the detection output. Thus, the frequency of the oscillation output of the voltage controlled oscillator 11, obtained at the output of the amplifier 51 by means of a buffer amplifier 56, changes as a function of the detection output of the phase difference detection circuit 10.

This oscillation output from the voltage controlled oscillator 11 is transmitted via frequency divider 12 to the phase difference detection circuit 10 for phase comparison with the oscillation output that is supplied from the oscillator circuit 7. If any phase difference is measured between these oscillation outputs, a detection output corresponding to the phase difference is output from the phase difference detection circuit 10 for feedback control of the oscillation phase of the voltage controlled oscillator 11 to decrease the phase difference. The detection output of the phase difference detection circuit 10 of the PLL type phase detection circuit 8 finally is output as the detection output by means of LPF 13.

Thus an ultimate detection output is obtained from this PLL type phase detection circuit 8 as a function of changes in the relative distance d between the capacitance detection electrode 6 and the magneto-optical disk 1, that is, in the relative distance between the magnetic head 2 and the magneto-optical disk 1.

This detection output is transmitted to a phase compensator 14 for phase compensation and thence to head drive means 15. The drive means 15 operates, with the detection output as a control signal, to drive the magnetic head 2, together with the capacitance detection electrode 6, in a direction towards or away from the disk 1 as shown by the arrow Y by, for example electromagnetic means, for maintaining a constant relative distance between the magnetic head 2 and the magneto-optical disk 1.

In this manner, with the present magnetic head position control apparatus, the control signal for the head drive means 15 is produced by the PLL type phase detection circuit 8, which includes the voltage controlled oscillator 11 having oscillation characteristics similar to those of the oscillation circuit 7. Thus, any errors caused by different temperature characteristics of the various circuit elements such as the coils 42, 52, or those caused by nonlinear characteristics of the voltage controlled oscillator 11 may be eliminated to realize a highly accurate control operation. In addition, use of the PLL type phase detection circuit 8 provides a high gain as compared with a control circuit in which the oscillation output of the oscillator circuit 7 is directly converted into an electrical voltage for driving the magnetic head 2 without the use of the PLL type phase detection circuit. Thus, the PLL type phase detection circuit provides a highly accurate wide-range control operation.

In accordance with the above-described magnetic head position control apparatus, a positioning servo operation is performed on the magnetic head as a function of the capacitance formed between the recording surface 5 (metal evaporated surface) of the magneto-optical disk 1 and the capacitance detection electrode 6. However, there is a risk that when the size of the disk 1 or the area of the recording surface changes, the control operation may not result in an optimum magnetic gap at all times.

Thus, the capacitance may be affected when the magneto-optical disk 1 is loaded on the turntable, because stray capacitance Co may form between the reflective surface, which may be aluminum foil, formed by evaporation on the recording surface of the optical disk and the turntable. Such stray capacitance Co would then cause the oscillation frequency of the oscillation circuit 7 to change.

Since the stray capacitance Co changes markedly with the diameter of the magneto-optical disk loaded on the turntable and more so with the area of the vaporized metal surface which forms the recording surface of the magneto-optical disk, the relative distance d from which the magnetic head is positioned from the disk changes slightly with the size of the magneto-optical disk, so that the magnetic gap d cannot be initially set to an optimum value.

A magneto-optical head position control apparatus according to the present invention, designed for obviating the above mentioned drawbacks, will be hereinafter explained.

Figure 6:
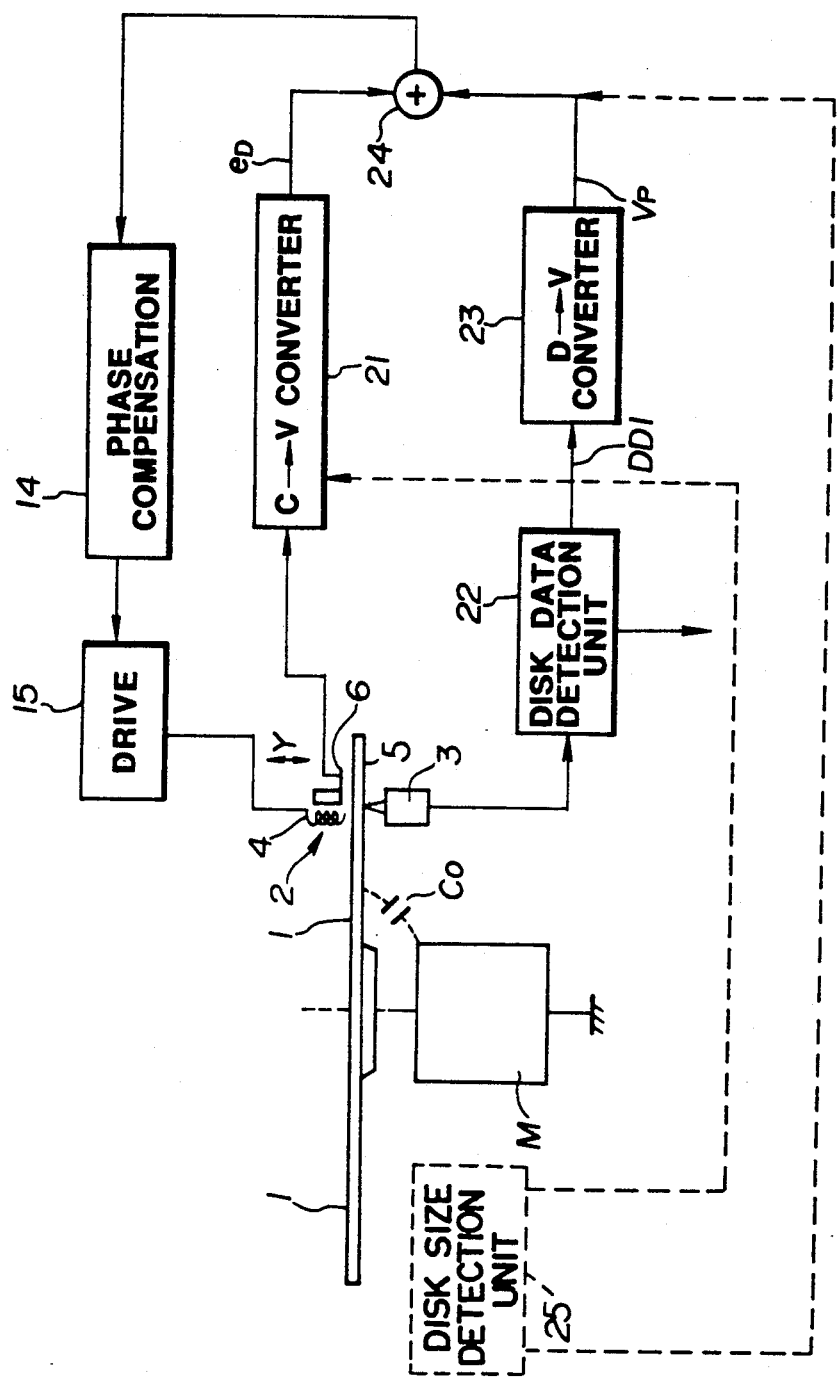
FIG. 6 a block diagram showing a magnetic head position control apparatus according to another embodiment of the present invention.

FIG. 6 is a block diagram illustrating the above mentioned magnetic head position control apparatus, wherein the same parts as those of FIG. 1 are designated by the same reference numerals. For example, numeral 1 denotes the magneto-optical disk, numeral 2 denotes the magnetic head mounted in opposition to the disk 1, and numeral 3 denotes the optical head.

The output of the capacitance detection electrode 6 is supplied to a C/V converter 21 for converting the capacitance values into corresponding signal voltages. Although the C/V converter 21 corresponds to the PLL type phase detection circuit 8, as shown in FIG. 1, it may also be constituted by other conversion units.

Disk data detection unit 22 measures the detection data output from the optical head 3. The detection data output from the optical head relates to the diameter of the magneto-optical disk 1, that is, the area of the recording surface on which a metal foil is deposited. This data is prerecorded on the lead-in area of the magneto-optical disk 1 in the form of bit data.

A D/V converting unit 23 converts the detected data to a voltage for selecting and outputting predetermined bias voltage signals from the data of the disk data detection unit 22. The output of this D/V converting unit 23 and the output of the C/V converting unit 21 are summed together at signal summing point 24. The summed data, which includes the predetermined bias signals from the D/V converting unit 23, is transmitted to the servo circuit of the magnetic head 2.

Figure 7:
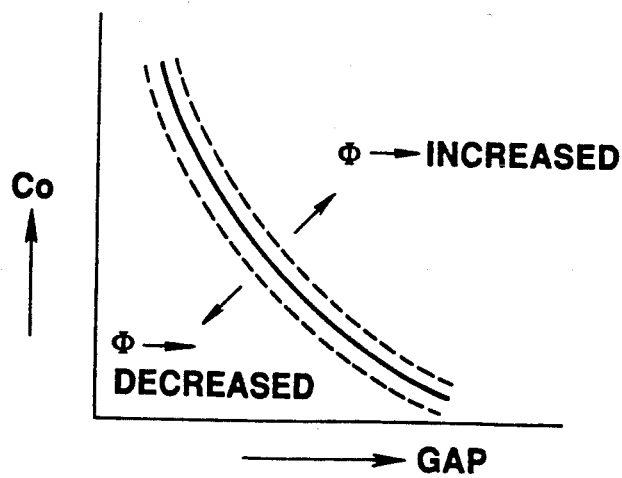
FIG. 7 is a illustrative diagram useful in explaining the effects of stray capacitance on detecting the distance between the magnetic head and the magneto-optical disk.

As the size $\phi$ of the magneto-optical disk 1 increases as shown in FIG. 7, the value of the stray capacitance Co between the disk 1 and the recording apparatus also increases as a general rule, which results in the capacitance value detected at the magnetic head 2 being increased. As a result, the servo circuit of the magnetic head 2 will compensate for the increase in detected capacitance by increasing the distance between the magnetic head 2 and the magneto-optical disk 1. In other words, the servo circuit will increase the magnetic gap d. When the magnetic head 2 is separated from the magneto-optical disk 1, the intensity of the impressed magnetic field is lowered.

In such a case, the D/V converting unit supplies to the servo circuit a bias signal, superimposed with the signal from the C/V converting unit, which will reduce the strength of the control signal to prevent the magnetic head 2 from being drawn too far away from the magneto-optical disk 1.

When the magneto-optical disk 1 being employed is of a lesser diameter, the stray capacitance Co becomes smaller so that by means of the D/V converter 23 the magnetic head 2 is controlled to move in the opposite direction to that described above, that is, the servo circuit tends to narrow the magnetic gap d. It is not desirable that the magnetic head 2 be closer to the magneto-optical disk 1 than the predetermined distance d since the magnetic head 2 may contact the recording surface of the magneto-optical disk 1 on application of a sudden impact on the magneto-optical recording apparatus, resulting in injury to the head 2 or to the disk 1.

However, according to the present invention, when a small-sized disk is loaded, the disk data detection unit 22 first reads data from the disk indicating that the disk is of a smaller size, and a bias signal suited to the disk size is supplied by the D/V converter 23 to the servo circuit to control the position of the magnetic head 2 to provide a magnetic gap d which will prevent the above mentioned inconvenience from occurring.

In this manner, the servo circuit of the present invention for controlling the magnetic head position is designed to compensate for the effects of any stray capacitance Co generated by different sized magneto-optical disks 1 that are loaded in the recording apparatus. The servo circuit of the present invention will automatically regulate the value of the bias signal output from the D/V converter 23, so that the magnetic head may be controlled to provide an optimum magnetic gap at all times.

The foregoing embodiment is useful when data relating to the size or the area of the disk are previously input in the lead-in area of the disk. However, the above-described embodiment may be arranged similarly to the conventional multiple disk player, so that a disk size detection unit 25 for detecting the size of the magneto-optical disk by a photosensor 26 may be provided, and a bias signal which will give the optimum magnetic gap for the particular loaded disk is selected by the detection unit 25 and transmitted to the signal summing point 24, as indicated by a broken line in FIG. 6.

The bias signal supplied to the servo circuit may also be input directly to the C/V converter 21, as shown by the dashed line connection in FIG. 6.

According to the present invention as described above, various predetermined bias signals which correspond to various sizes of magneto-optical disks are supplied to the servo circuit that controls the magnetic head position for compensating the effects of any stray capacitance caused by the vaporized metal surface of the magneto-optical disk being employed. Thus, a servo may supply the optimum magnetic gap at all times to the magnetic head to assure highly accurate data recording.

It is understood, of course, that the above is presented by way of example only and that many variations and modifications could be effected by one skilled in the art without departing from the spirit or scope of the invention, which is to be defined by the appended claims.

What is claimed is:

1. A magnetic head position control apparatus for controlling a magnetic head mounted in opposition to one side of a magneto-optical disk that has an optical head mounted in opposition to another side thereof, comprising:

a capacitance detection electrode mounted on said magnetic head and being in opposition to said one side of said magneto-optical disk;

an oscillator circuit having predetermined oscillation characteristics and being connected to said capacitance detection electrode for producing an oscillation output having a frequency that varies in response to changes in capacitance between said capacitance detection electrode and said magneto-optical disk;

a voltage controlled oscillator having oscillation characteristics substantially identical to those of said oscillator circuit and producing an oscillation output;

a phase locked loop phase detection circuit including said voltage controlled oscillator and connected to said oscillator circuit for producing a phase detection output representing a detected phase difference between the oscillation output of said voltage controlled oscillator and the oscillation output of said oscillator circuit and wherein said phase detection output controls the oscillation output of said voltage controlled oscillator;

bias signal generating means connected to an output of said optical head for generating bias signals from prerecorded data relating to the area on which a metal foil is deposited on said magneto-optical disk detected by said optical head;

summing means connected to said bias signal generating means and to the phase detection output of said phase locked loop phase detection circuit for summing said bias signals with said detection output and producing a summed signal; and drive means connected to the summed signal from said summing means for driving said magnetic head toward or away from a recording surface of said magneto-optical disk, whereby said drive means drives said magnetic head in response to the output of said summing means.

2. An apparatus according to claim 1, wherein said bias signal generating means includes detection means connected to said optical head for detecting the prerecorded data relating to the area of the recording surface on which the metal foil is deposited contained in signals reproduced by said optical head from said disk.

3. A magnetic head position control apparatus for controlling a magnetic head mounted in opposition to one side of a magneto-optical disk that has an optical head mounted in opposition to another side thereof, comprising:

a capacitance detection electrode mounted on said magnetic head and being in opposition to said one side of said magneto-optical disk;

drive means connected to said magnetic head for driving said magnetic head toward or away from a recording surface of said magneto-optical disk;

capacitance-to-voltage converting means connected to said capacitance detection electrode for generating a detection signal in accordance with the capacitance detected by said capacitance detection electrode;

bias signal generating means for detecting data prerecorded on said magneto-optical disk relating to an area of said disk covered by a metal foil and generating a bias signal in accordance with the detected data; and summing means connected to said capacitance-to-voltage converting means and to said bias signal generating means for summing said detection signal with said bias signal and for feeding the summed signal to said drive means, whereby said drive means drives said magnetic head in response to the summed signal from said summing means.

4. An apparatus according to claim 3, wherein said bias signal generating means includes means connected to said optical head for detecting the prerecorded data relating to the area of the recording surface on which the metal foil is deposited contained in signals reproduced by said optical head from said disk.

5. A magnetic head position control apparatus for controlling a magnetic head mounted in opposition to one side of a magneto-optical disk that has an optical head mounted in opposition to another side thereof, comprising:

a capacitance detection electrode mounted on said magnetic head and being in opposition to said one side of said magneto-optical disk;

drive means connected to said magnetic head for driving said magnetic head toward or away from a recording surface of said magneto-optical disk;

capacitance-to-voltage converting means connected to said capacitance detection electrode for generating a capacitance detection signal in accordance with the capacitance detected by said capacitance detection electrode;

disk size detection means for detecting a size of the outside diameter of said magneto-optical disk and generating a bias signal in accordance with the detected outside diameter; and summing means connected to said capacitance-to-voltage converting means and to said disk size detection means for summing said capacitance detection signal and said bias signal and for feeding the summed signal to said drive means, whereby said drive means drives said magnetic head in response to the summed signal from said summing means.

* * * * *